A. JACKSON.
AUTOMOBILE LOCK.
APPLICATION FILED MAY 10, 1919.
1,340,051. Patented May 11, 1920.
2 SHEETS—SHEET 1.
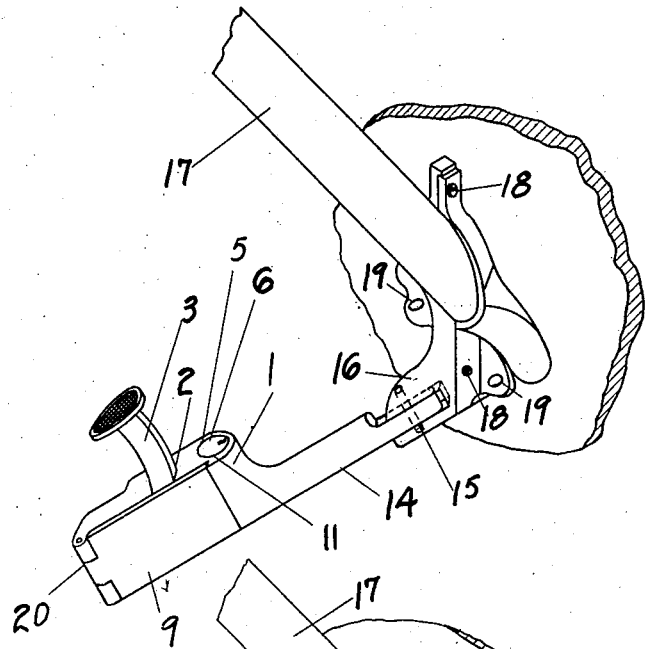
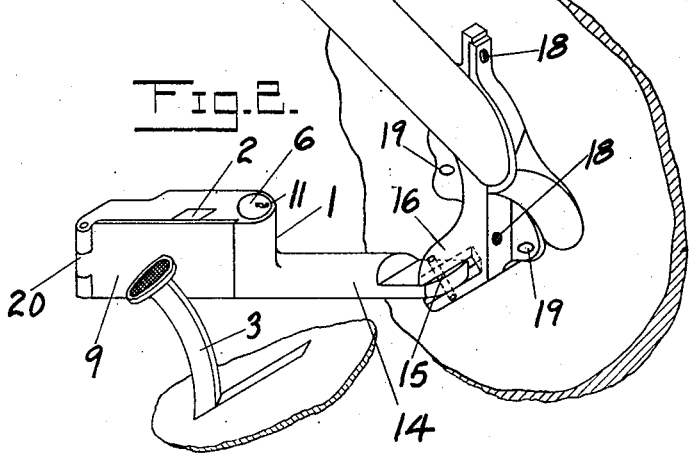
INVENTOR.
A. Jackson.
BY Adam E Fisher
ATTORNEY.

A. JACKSON.
AUTOMOBILE LOCK.
APPLICATION FILED MAY 10, 1919.
1,340,051.
Patented May 11, 1920.
2 SHEETS—SHEET 2.
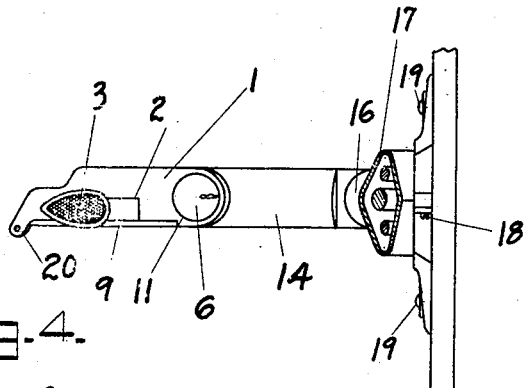
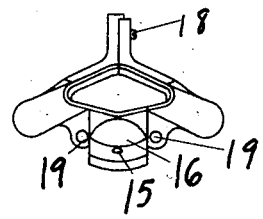
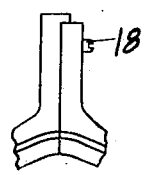
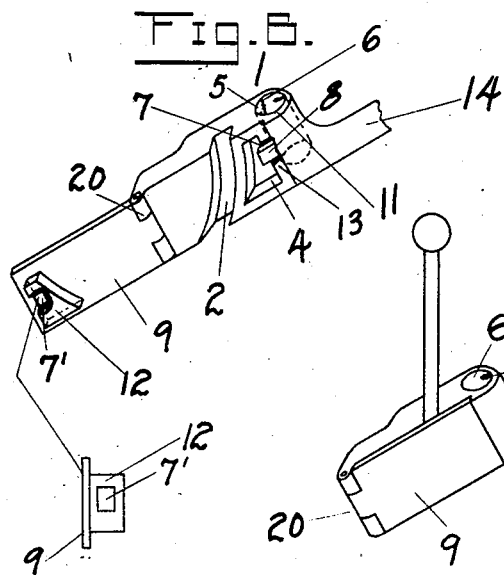
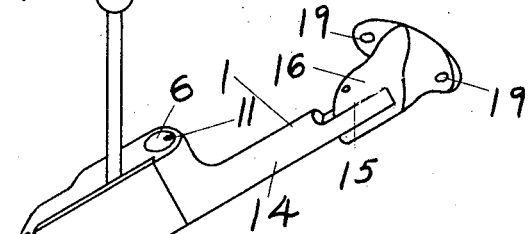
INVENTOR.
A. Jackson.
BY Adam E Fisher
ATTORNEY.

UNITED STATES PATENT OFFICE.

AVIS JACKSON, OF EAST ST. LOUIS, ILLINOIS.

AUTOMOBILE-LOCK.

1,340,051.   Specification of Letters Patent.   Patented May 11, 1920.

Application filed May 10, 1919. Serial No. 296,127.

*To all whom it may concern:*

Be it known that I, AVIS JACKSON, a citizen of the United States, residing in the city of East St. Louis and State of Illinois, have invented new and useful Improvements in Automobile-Locks, of which the following is a specification, reference being had to the accompanying drawings.

The present invention pertains generally to automobile locks, and may be adapted for use upon any standard automobile. The form and construction herein described and shown, however, has to do especially with locks adapted for cars wherein the clutch stands normally disengaged, as in the Ford automobile, or cars of similar construction.

In cars of such construction, the clutch stands ordinarily disengaged, and the clutch lever has to be pushed forwardly and downwardly in order to throw the clutch into engagement, so that the machine may be propelled. While the present lock is here shown and described, therefore, in relation to cars of this construction, it may however as above stated, be adapted even to cars wherein the clutch stands normally engaged, by slight modification in the construction of certain parts or elements of the lock.

The main object of the present invention is to provide a simple, practical, safe and durable device in the nature of an automobile lock, the function of which is to hold the clutch disengaged, so that even though the engine may be running, no power would be transmitted through the power transmission shaft to the wheels, and thus the unauthorized use of the machine would be prevented.

Another object is to produce a lock which may be firmly and permanently anchored at or near the base of the steering post, and so pivoted for lateral movement that the jaws of the lock may be readily swung into or out of operative position relative to the clutch lever.

Another object is to produce the lock in as few parts as possible, and which when assembled in operative position, will constitute an efficient device for the purposes intended.

With these objects in view, attention is called to the accompanying drawings illustrating the preferred construction of the lock as applied to a car of the Ford type, and wherein—

Figure 1 is a perspective view showing the lock in operative position upon such a car, the jaws thereof being closed upon the clutch lever, so as to hold the clutch disengaged;

Fig. 2 is a similar view showing the lock opened and swung away from the said clutch lever, as would be the position of the lock when out of use while the car itself were being operated;

Fig. 3 is a top plan view;

Fig. 4 is a detail of the anchor collar, by means of which the lock is anchored to the foot board at the base of the steering post;

Fig. 5 is a detail showing a method of constructing the anchor collar so that the meeting joints thereof overlap in a way to prevent the unwarranted insertion of a chisel or bar for prying same apart;

Fig. 6 is a detail showing the jaws of the lock in open position, and revealing the formation of the chambered lever slot, the bolt-lug and mortise for receiving same, and the location and operation of the lock and lock bolt.

Fig. 7 is a detail showing a modification wherein a solid anchor plate is employed to anchor the forward end of the swinging arm, while the rear end engages the change speed lever instead of the clutch lever.

Referring more particularly to the drawings, my invention consists of a clutch lever engaging jaw 1, which is chambered out on one side, preferably the right-hand side, to form the clutch lever slot 2, adapted to receive and hold the clutch lever 3, or other operating lever. This clutch lever engaging jaw 1 is also mortised out forwardly of the said clutch lever slot 2 to form the bolt-lug mortise 4. Also, it is bored or chambered out at its forward end immediately in advance of the bolt-lug mortise 4 to form the lock-mortise 5, said lock-mortise 5 opening preferably upwardly, and being adapted to receive and hold an ordinary cylindrical mortise lock 6 of the pin type. This lock 6 is suitably and permanently secured and anchored in place as by riveting or beating over the upper edges of the lock-mortise 5 down upon the top of the lock 6, so as to form a retaining flange 11, or of course any other suitable method may be employed. A bolt-mortise 7 extends from the lock-mortise 5 through the wall 13 thereof horizontally back into the bolt-lug mortise 4, so as to permit the bolt 8 of the lock 6 to slide back and forth through said bolt-mortise 7. Pivotally attached to the rear end of the clutch lever jaw 1 by means of the hinge joint 20 is the lock-jaw 9, same being somewhat less in length than the clutch lever jaw 1, and adapted to close upon the latter by swinging laterally forward. This lock-jaw 9 is provided at its forward end with a permanently joined bolt-lug 12, adapted to close into the bolt-lug mortise 4, said bolt-lug being L shaped on a longitudinal, vertical section. The purpose of this form of the lug is to add strength thereto. The bolt-lug 12 is pierced longitudinally with a bolt-mortise 7′ adapted to register with its complementary bolt-mortise 7 extended through the wall 13 intervening between the bolt-lug mortise 4 and the lock-mortise 5. Thus mounted, the bolt 8 of the lock 6 is adapted to slide back and forth through said bolt-mortises 7 and 7′, thus locking the lock-jaw 9 into closed relation against the clutch lever jaw 1. The clutch lever jaw 1 is extended integrally forwardly to form the arm 14, and the forward end of this arm 14 is pivoted at 15 to the anchor collar 16 in such manner that the clutch lever jaw 1 may be swung laterally into or out of operative position relative to the clutch lever 3. The anchor collar 16 may be made in segments and bolted together around the base of the steering post 17 by means of bolts 18, and may be likewise bolted to the floor by means of the bolts 19, thus locking the entire apparatus in secure position.

In operation, the clutch lever engaging jaw 1 is swung into engagement with the clutch lever 3 and so that the lever slot 2 will receive the clutch lever 3. The lock jaw 9 is then closed forwardly against the clutch lever jaw 1. The key is then inserted in the lock 6, and the bolt 8 is shot through the bolt-mortises 7 and 7′. Thus the clutch lever 3 is securely locked in its disengaged position. In order to unlock, the operation is, of course, reversed.

While I have herein described the apparatus as applied to a car of the Ford type, certain slight modifications would adapt it to cars of any standard type, and while I have shown the anchor collar as mounted around the base of the steering post, an ordinary solid anchor plate might be substituted for the anchor collar and mounted adjacent to the steering post instead of encircling the same. Likewise, the lock might be adapted to engage any other of the operating levers of the car instead of the clutch lever, as for instance, the gear shifting lever; as shown in Fig. 7; and while I have herein described a certain specific manner and method of constructing and assembling the elements of my invention, it is understood I may vary from the same in minor details, not departing from the spirit of the invention as laid down in the appended claims.

What I claim to be new and patentable is:

1. In combination with an automobile and its clutch lever, a lock for the same, comprising a segmental anchor collar adapted to interlock around the steering post and attach to the floor; a lever clamp, pivoted forwardly to said anchor collar and ending rearwardly in two hingedly connected jaws adapted to close together over said lever, one of said jaws having a mortised bolt-lug, and the other jaw being mortised out to receive a mortise-lock and said bolt-lug and lever; and a mortise-lock permanently set within its mortise in said jaw, with its bolt adapted to engage said mortised bolt-lug, to lock said jaws of said lever-clamp together over said lever.

2. In combination with an automobile and one of its operating levers, a lock for the same, comprising an anchor collar adapted to encircle the steering post and attach to the floor; a lever clamp, embodying a main lever-engaging jaw extended forwardly and pivoted to said anchor collar so as to swing sidewise, and mortised at its rear end with a frontal lock-mortise, a medial bolt-lug-mortise, a rear lever mortise, and an interior bolt-mortise connecting the said bolt-lug-mortise and lock-mortise, and a short lock-jaw hinged rearwardly to said lever engaging jaw, and carrying forwardly a mortised L shaped bolt-lug adapted to enter its mortise aforesaid as the two jaws are closed together over said lever; and a mortise-lock permanently set within its mortise in said jaw, with its bolt adapted to engage said mortised bolt-lug through said connecting bolt-mortise, so as to lock said jaws of said lever clamp together over said lever.

3. In combination with an automobile and its clutch lever, a lock for the same, comprising a segmental anchor collar adapted to interlock around the steering post and attach to the floor; a lever clamp, embodying a main lever-engaging jaw extended forwardly and pivoted to said anchor collar so as to swing sidewise and mortised at its rear end with a frontal lock-mortise, a medial bolt-lug-mortise, a rear lever mortise, and an interior bolt-mortise connecting the said bolt-lug-mortise and lock-mortise; and a short lock-jaw, hinged rearwardly to said lever engaging jaw, and carrying forwardly a mortised, L shaped bolt-lug adapted to enter its mortise aforesaid as the two jaws are closed together over said lever; and a mortise-lock permanently set within its mortise in said jaw, with its bolt adapted to engage said mortised bolt-lug through said connecting bolt-mortise, so as to lock said jaws of said lever clamp together over said lever.

4. In combination with an automobile and the clutch lever thereof, an automobile lock, comprising an arm pivotally anchored at its forward end and swinging horizontally backward so as to engage said clutch lever; vertical mortises cut in the rear end of said arm, one of said mortises being adapted to receive said clutch lever, another being adapted to receive a bolt-lug and another being adapted to receive a mortise-lock; a lock-jaw hinged to the said arm and adapted to close down over said clutch lever mortise and said bolt-lug mortise; a mortised bolt-lug permanently mounted at the forward end of said lock jaw and adapted to enter the bolt-lug-mortise, aforesaid; a horizontal bolt-mortise connecting said lock-mortise and said bolt-lug-mortise; and a mortise lock mounted in said lock-mortise.

AVIS JACKSON.

Witnesses:
A. K. DOHLE,
A. M. DOWD.